3,280,004
WATER COOLED NUCLEAR REACTOR WITH IMPROVED CORE AND REFLECTOR RECIRCULATION SYSTEM
Ronald Peter Williams, Frodsham, and Roy Hartwell, Newton-le-Willows, England, assignors to United Kingdom Atomic Energy Authority, London, England
Filed Jan. 29, 1964, Ser. No. 340,885
Claims priority, application Great Britain, Feb. 4, 1963, 4,456/63
1 Claim. (Cl. 176—61)

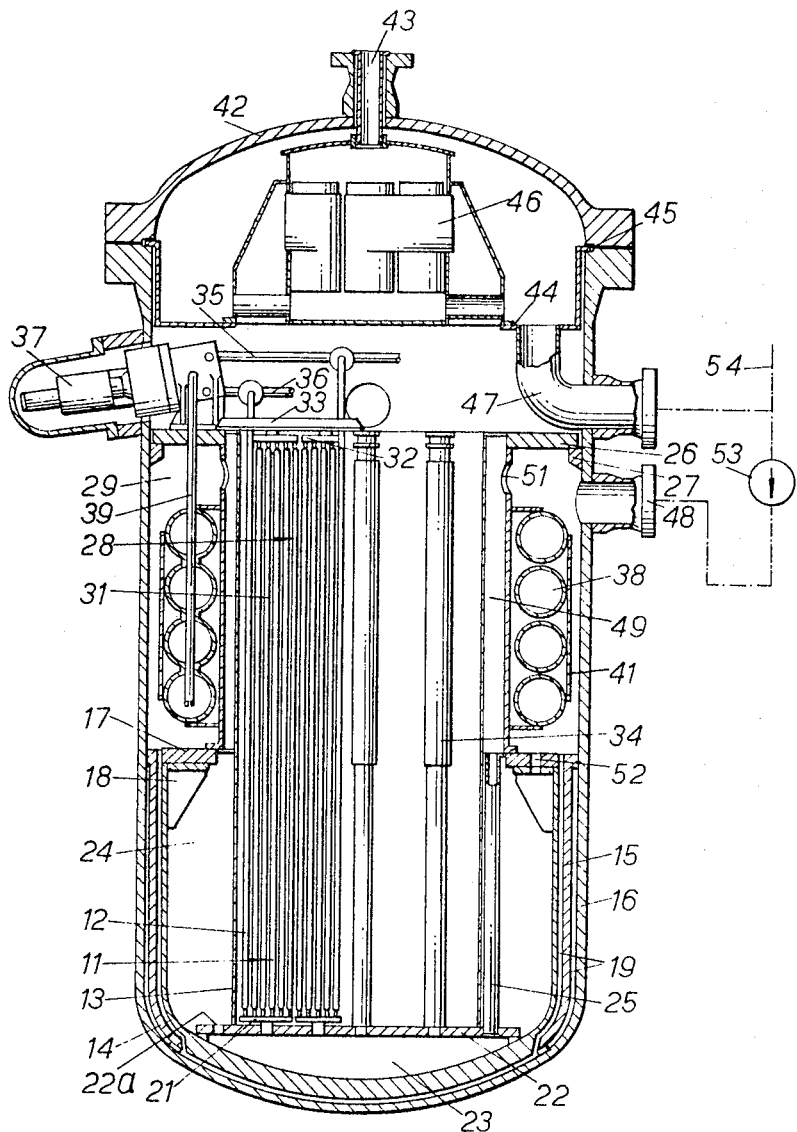

This invention relates to nuclear reactors and is concerned with nuclear reactors in which the nuclear reactor core is cooled by a water coolant.

Such a reactor has the characteristic that the water coolant by which its core is cooled also has a significant neutron-moderating power which is dependent upon the density of the water. For water of a given isotopic composition, the density is dependent upon the temperature and the voidage caused by any steam content. Accordingly it has been proposed that the reactivity in the case of a boiling water reactor should be controlled by adjustment of the temperature of the water flowing into the core; furthermore, it has been proposed that this temperature adjustment should be an automatic consequence of a variation in the steam load demanded of the reactor. It has been found, however, that in such a reactor with automatic adjustment of water temperature with load variation, instabilities are introduced into the operation of the reactor if there is delay between a load variation and a reflection of the load variation at the core by means of a water temperature variation.

According to the present invention, in one of its aspects, a nuclear reactor having inside a reactor vessel a core from which heat is abstracted by a water coolant, is characterised in that a path for recirculation of the coolant to an inlet plenum below the core includes upright passages for increasing the recirculation rate, these passages extending beside the core within a chamber formed for the reception of water coolant between the inner walls of the vessel and the core and representing only a minor portion of the volume of this chamber. It is a particular feature of the invention that a boiling water reactor is thus characterised.

The water coolant occupying the chamber around the core may act as a reflector. The effect of the invention is that the water coolant recirculating to the core, or at least the bulk of it, is not called upon to flow through the full volume of the reflector chamber and can therefore cover the distance from one end to the other at an increased rate. Some of the recirculating coolant may be diverted through the reflector chamber to avoid stagnation but the flow is slight.

The invention has particular application in a reactor of the type having a coolant pressuriser. For this application the recirculation path includes a portion which leads to the upright passages in a manner by-passing a compartment for the pressuriser. A reactor of this type is described and claimed in copending patent application 238,439, filed November 19, 1962, now U.S. Patent No. 3,201,319, in which a neutron-moderating heat transfer medium (hereinafter referred to as the primary coolant) is interposed between fuel elements in the reactor core and the water coolant (hereinafter referred to as the secondary coolant). In this reactor boiling of the primary coolant is countered by means of the pressuriser which is in communication with a circuit for the primary coolant, the pressuriser being housed in an annular compartment above the reactor core and being cooled by recirculating secondary coolant. In accordance with the invention, the pressuriser compartment is open to the recirculating secondary coolant but by means, for example, of apertures in the pressuriser compartment only a slight measure of flow of secondary coolant through the compartment takes place.

One construction of nuclear reactor embodying the invention will now be described by way of example with reference to the accompanying drawing which shows a vertical section through the reactor; fuel tubes are removed on the right hand side of the reactor to disclose reactor shut-off rods.

The reactor now to be described is a boiling water reactor having a core 11 located in a generally cylindrical core region defined by a baffle 13 and housed in a pot 14. A thermal shield 15 is interposed between the core pot and the wall of a reactor vessel 16 in the lower part of which the pot is situated. The pot is covered by an intermediate support plate 17 which is carried by brackets 18. Clearances 19 between the pot, the thermal shield and the reactor vessel are to be filled with water to provide additional thermal shielding.

Fuel elements in the core 11 are housed in fuel tubes 12 through which pressurised light water is circulated as a primary coolant. The fuel tubes are grouped in packs of tubes, each pack being located at its lower end in a single end plate 21. The end plates 21 are supported by a bottom grid 22 which traverses the bottom of the reactor vessel 16 and thus defines an inlet plenum 23 for a secondary coolant, in the form of light water, which is circulated upwards from the plenum through the core. Apertures, such as 22a shown to an exaggerated size for clarity, in the bottom grid 22 permit secondary coolant water to fill an annular reflector chamber 24 which is defined by the baffle 13 and the pot 14. The water in the reflector chamber serves as a neutron reflector surrounding the core whilst neutron moderation in the core is effected by the primary and secondary coolants. Upright recirculation passages 25 open at their lower ends into the inlet plenum and extend upwards beside the core to apertures through the intermediate support plate 17. There are twelve of the recirculation passages 25 disposed around the core for the purpose of conducting recirculating secondary coolant water to the inlet plenum 23; the passages 25 are received within flutes formed in the periphery of the core baffle 13, these flutes conforming with irregularities in the core outline due to the shape of the fuel tube packs.

The baffle 13 extends above the intermediate support plate 17 to a top support plate 26 supported from the reactor vessel by brackets 27. The baffle defines a central heat transfer region 28 above the core 11 and an annular pressure compartment 29. Within the heat transfer region 28 are clustered unfuelled extension tubes 31 which are integral extensions of the fuel tubes 12. The extension tubes 31 are grouped in packs, as are the fuel tubes, and each pack is located at its upper end in a single end plate 32. These end plates 32 are secured to struts 33 which traverse the top of the heat transfer region and which are mounted at their ends on the top support plate 26. Telescopic, hydraulically operated shut-off mechanisms 34 also extend between the struts 33 and the bottom grid 22; these mechanisms incorporate rods of neutron-absorbing material which are introduced into and withdrawn from the reactor core.

Within each pack of tubes the upper ends of the extension tubes and the lower ends of the fuel tubes are interconnected to form flowpaths of serpentine configuration for circulation of the primary coolant. In this manner the packs of tubes provide a number of passes connected in parallel between headers 35 and 36 which act as common inlet and outlet headers. Three primary coolant circulators 37 (of which only one is shown) maintain circulation of primary coolant through these headers and their associated tubes. In order to counter boiling of the primary coolant, the primary coolant is pressurised by means of a toroidal pressuriser 38 which communicates with each pump 37 through a pipe 39. The pressuriser 38 is housed in a casing 41 and located in the pressuriser compartment 29.

The reactor vessel 16 is closed by a steam dome 42 from which a steam outlet pipe 43 projects. A web 44, suspended by flanges 45 gripped between the reactor vessel and the steam dome, supports steam separators 46 and is fitted with a discharge duct 47. In its upward passage through the core and the heat transfer region, the secondary coolant is boiled to form a mixture of steam and water which is separated by the separators. The separated steam is delivered through the outlet 43 whilst the unevaporated water is discharged through the duct 47 to secondary coolant circulators, indicated diagrammatically 53, which are situated outside the reactor, as are also the means 54 for adding feed water to the secondary coolant recirculation flow. This flow is taken back into the reactor through inlet ducts 48 which open into the pressuriser chamber 29. In its passage outside the reactor the secondary coolant is subjected to a temperature adjustment by addition of cool feed water; as described above this temperature adjustment is made for the purpose of controlling the reactivity of the reactor.

Within the pressuriser compartment 29, an annular recirculation space 49 extends between the intermediate and top support plates 17 and 26. This space communicates with the twelve passages 25 in the reflector chamber. At the upper end of the space 49 there are apertures 51 through which recirculated secondary coolant enters for flow to the passages 25 and from thence to the inlet plenum. The pressuriser compartment 29 is consequently filled with secondary coolant which is almost still. The coolant in the pressuriser compartment determines the temperature of the pressuriser itself. Small apertures, such as 52 shown to an exaggerated size for clarity, are provided at the lower end of the pressuriser compartment 29 to cause a very slow flow of the secondary coolant in series through the pressuriser compartment and the reflector chamber 24 to the inlet plenum 23.

It can now be seen that the reactor described above is provided with means for effecting a rapid delivery of incoming recirculated secondary coolant from the inlets 48 to the reactor vessel to the inlet plenum 23 and thus to the core 11; the means take the form of the space 49 and the passages 25. Accordingly a temperature change caused in the recirculating secondary coolant for control purposes is effective in the reactor core 11 with little delay. In the case of the illustrated reactor the transit time under full load operation from the steam separators 46 to the inlet ducts 48 was found to be exactly 2 secs. The transit time from the inlet ducts to the inlet plenum 23 was found to be 2.94 secs. without the space 49 and the passages 25, but was reduced to 1.44 secs. with these items present. The total recirculation time was therefore reduced from 4.94 secs. to 3.44 secs., an improvement of nearly 30%.

What we claim is:

A nuclear reactor comprising a reactor vessel; a reactor core disposed upright in the vessel for cooling by a water coolant; a baffle surrounding the core and defining with the inner walls of the vessel an annular reflector chamber; means forming within the vessel a compartment above the reflector chamber; a coolant pressurizer disposed in the compartment; an inlet plenum beneath the lower end of the core; a plurality of passages extending upright in the reflector chamber alongside the baffle and opening at their lower ends into the inlet plenum; coolant conducting means for conducting recirculating coolant from the other end of the core to the upper ends of the passages, said conducting means including a portion extending externally of the vessel, an inlet duct connected to said portion and penetrating the vessel adjacent the compartment, and means dividing off within the compartment a flow space communicating the duct with the upper ends of the passages; and means to divert through the compartment and through the reflector chamber a slight flow of recirculating coolant in parallel with the flow through the passages.

References Cited by the Examiner
UNITED STATES PATENTS

| 3,108,937 | 10/1963 | Kumpf et al. | 176—61 |
| 3,175,954 | 3/1965 | Potter | 176—61 |
| 3,201,319 | 8/1965 | Hackney et al. | 176—54 |

L. DEWAYNE RUTLEDGE, *Primary Examiner.*